United States Patent [19]
Spaulding et al.

[11] Patent Number: 5,377,041
[45] Date of Patent: Dec. 27, 1994

[54] METHOD AND APPARATUS EMPLOYING MEAN PRESERVING SPATIAL MODULATION FOR TRANSFORMING A DIGITAL COLOR IMAGE SIGNAL

[75] Inventors: Kevin E. Spaulding, Spencerport; Kevin C. Scott, Rochester, both of N.Y.

[73] Assignee: Eastman Kodak Company, Rochester, N.Y.

[21] Appl. No.: 143,674

[22] Filed: Oct. 27, 1993

[51] Int. Cl.$^5$ .............................................. H04N 1/46
[52] U.S. Cl. .................... 358/518; 358/519; 358/523; 358/530
[58] Field of Search ............. 358/518, 521, 523, 534, 358/535, 447, 455, 456, 457, 458, 460; 345/186–188, 199; 382/50, 52; 348/639, 646, 651, 660, 720, 405, 419

[56] References Cited
U.S. PATENT DOCUMENTS

5,050,000  9/1991  Ng ........................ 358/457
5,162,925  11/1992 Takaoka et al. ............ 358/447
5,243,443  9/1993  Eschbach ................. 358/455

Primary Examiner—Scott A. Rogers
Attorney, Agent, or Firm—Thomas H. Close

[57] ABSTRACT

This invention minimizes the visibility of quantization artifacts associated with multi-dimensional color-calibration look-up tables of a limited size. Such artifacts occur when it is not practical to use interpolation methods to approximate color values which are intermediate to the color values stored in the look-up table. In such cases the input color signals are simply quantized for the purpose of addressing the look-up table. This invention works by applying local mean preserving spatial modulation to the input color image values prior to the quantization step. As with multi-level halftoning techniques, the result is that the appearance of intermediate color values is created because the observer will spatially average the output color values.

10 Claims, 7 Drawing Sheets

METHOD AND APPARATUS EMPLOYING MEAN PRESERVING SPATIAL MODULATION FOR TRANSFORMING A DIGITAL COLOR IMAGE SIGNAL

FIELD OF THE INVENTION

The present invention relates to the field of digital color imaging systems, and more specifically to a process of performing color-calibration and/or color space transformations so as to minimize color errors and contouring.

BACKGROUND OF THE INVENTION

In a digital color imaging system, a color image is represented as a set of color picture elements ("pixels"). Each pixel has associated with it a set of color values which describe the color (hue, saturation and lightness) for that position in the image. The color values correspond to the color coordinates in some given color space. There are many different color spaces (e.g. RGB, CIE tristimulus (XYZ), CIELAB, CIELUV, CMY(K), etc.) which are commonly used. Some color spaces, such as XYZ, CIELAB, and CIELUV are device independent and will therefore give an absolute measure of the color for each pixel in the image. Others, such as RGB and CMY(K), are device dependent and can only be related to an absolute color value if the spectral characteristics of a specific device are known.

For many applications it may be necessary to be able to take color image data from one device and display, manipulate, and/or print it on another device which may have very different spectral characteristics. For this reason, it is often necessary to be able to take image data in one color space, and convert it to a different color space. For example, it may be required to take RGB data from an input scanner and convert it to a device independent space such as CIELAB. This device independent data could then be used by a variety of different output devices which could then convert the data to their own device dependent color space for display. This permits the various devices to be calibrated so that the image will have the same color appearance regardless of what output device is used.

The transformation from one color system to another relates the coordinates in one space to those in a different color space. In some cases, this color transformation may be as simple as a matrix multiplication, as in the case of transforming from a video RGB space to XYZ. In other cases the transformation is more complex, such as when transforming CIELAB into CMY(K).

A technique which is used in many applications to implement various color space transformations is a multi-dimensional color-calibration look-up table. This approach has the advantage over other methods, such as matrix techniques, that very general color transformations can be specified. This is particularly helpful for transforming to hard-copy device color spaces due to their complex color reproduction characteristics. Due to the flexibility of the multi-dimensional look-up table approach, it is also useful for implementing many color enhancement schemes, and for combining many color transformation steps into a single step. This approach can be implemented in digital hardware and permits fast "computation" of the color transformation even when the actual mathematical equations relating the two color spaces are very complex.

Figure 1:
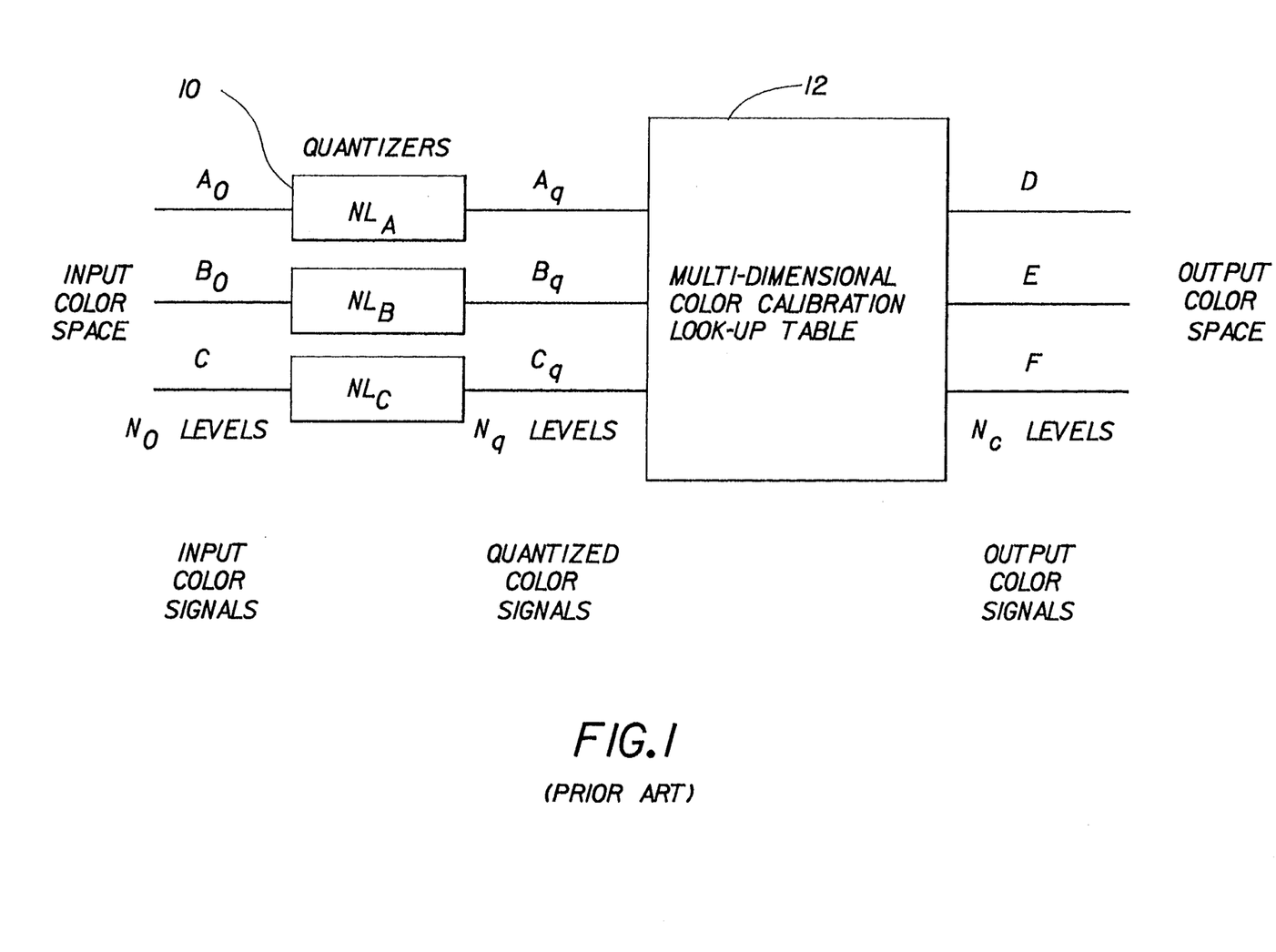
FIG. 1 is a generic block diagram of a portion of a system showing a prior art implementation of a multi-dimensional color-calibration look-up table.

The basis of the multi-dimensional look-up table approach is to store the output color values for a large number of combinations of input color values. For example, to convert from a video RGB space to a printer CMY(K) space, the desired printer code values could be stored for every combination of input RGB values. However, if each channel of the input RGB space consisted of 8-bit numbers, this would require storing $256^3 = 16,777,216$ different output color values. For an 8-bit CMYK printer 64 MBytes of memory would be required to store the table. This would be impractical for many applications due to the large memory requirements. In practice, it is usually necessary to use smaller look-up tables. For example, reducing the table size to $16^3$ will reduce the required memory in the above example to 16 KBytes. One way to use this smaller table is simply to quantize the input color values to the nearest look-up table entry. This configuration is shown in FIG. 1., where in a generalized environment input color image data exists in some multi-channel color space, denoted as ABC, where ABC may represent RGB, XYZ, CIELAB, CIELUV, CMY(K), etc. The color coordinates in this space are known with some precision specified by the number of digital levels, $N_o$. It is desired to convert the color information for some image into another color space, denoted as DEF, with some precision specified by the number of digital levels in the output color space ($N_c$ levels). The color conversion is carried out using a group of quantizers 10 which quantize the input color signals $A_o$, $B_o$, and $C_o$ to $N_q$ levels providing the quantized color signals $A_q$, $B_q$, and $C_q$, which are used to address a multi-dimensional color-calibration look-up table 12. The number of dimensions for the look-up table 12 corresponds to the number of color parameters in the input color space. Usually this is three dimensions, with the exception of CMYK space which would have four dimensions. In general, the number of digital levels for each channel of the input color space may be different, e.g., channel B may have $N_{qB}=64$ levels and channels A and C may have $N_{qA,C}=32$ levels. The color-calibration table 12 contains pre-calculated output color values for every possible combination of quantized input color values.

The problem that arises in using the approach shown in FIG. 1 is that many input colors are mapped to a single output color. The result will be image artifacts such as contouring where a smooth gradient in the input color space gets mapped to a stair-step in the output color space. The visibility of these artifacts can be minimized by choosing the optimum quantization levels to store in the look-up table as taught by Spaulding, Ray and Sullivan (U.S. patent application Ser. No. 980,860 filed Nov. 24, 1992). Although this will minimize the visibility of the quantization artifacts, it can not eliminate them altogether when small look-up table sizes are used.

Another method which is sometimes used to eliminate the quantization artifacts associated with small color-calibration look-up table sizes is to use an interpolation algorithm to approximate the output color values for input colors which are intermediate to the values that are stored in the table. A variety of interpolation methods can be used including tri-linear interpolation, and tetrahedral interpolation. Although this approach can effectively eliminate many of the artifacts introduced by the small look-up table size, the amount of extra computation associated with the interpolation will have a negative impact on the implementation speed.

Figure 2:
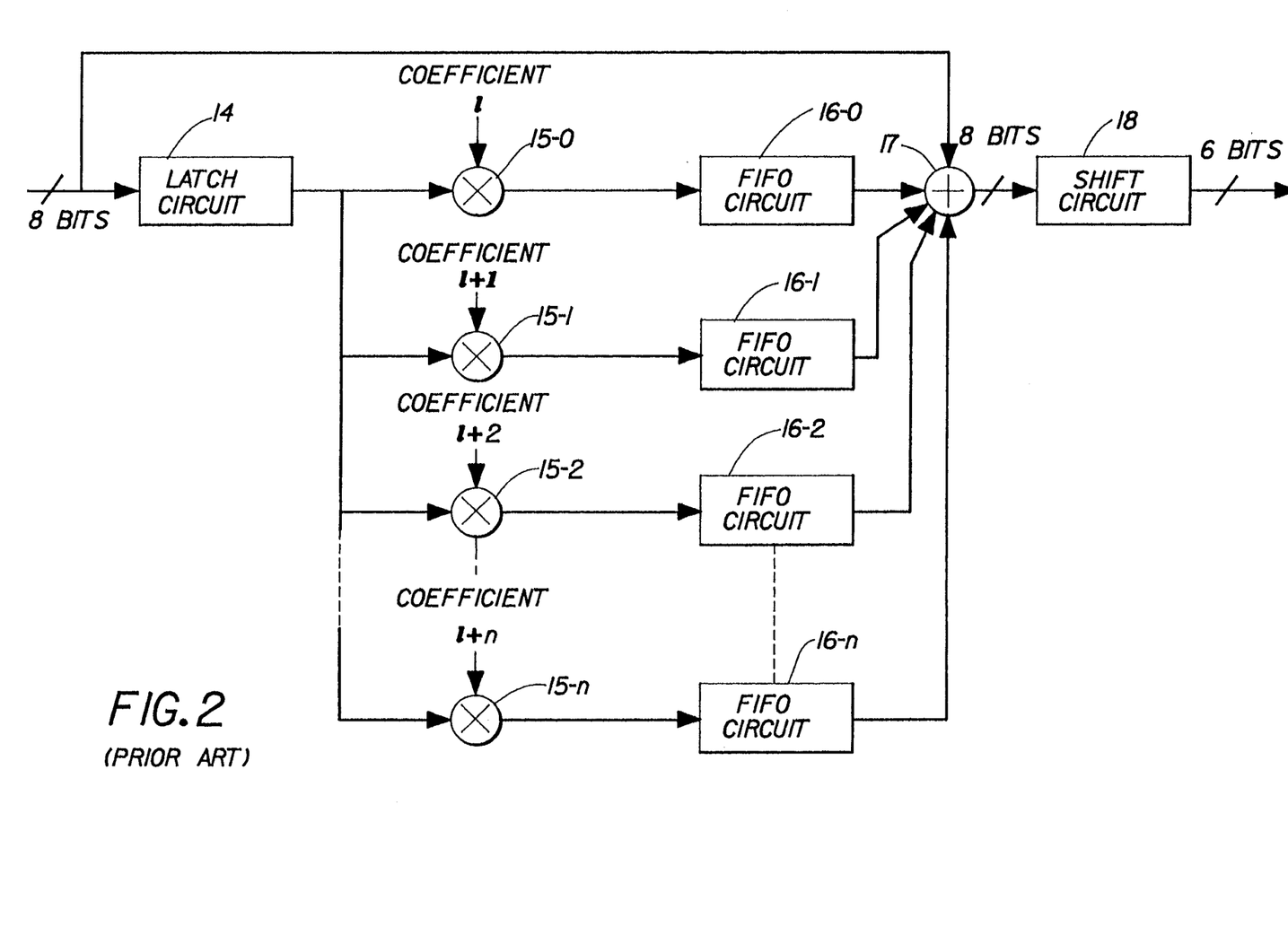
FIG. 2 is a block diagram of a portion of a system showing a prior art implementation for modifying the input signal to color calibration look up table.

Another approach, to minimizing the appearance of artifacts without adding the extra computation associated with interpolation is shown in U.S. Pat. No. 5,162,925 issued Nov. 10, 1992 to Takaoka et al. Takaoka et al disclose the use of a form of error diffusion on the input color signal to distribute truncation (a form of linear quantization) errors over a neighborhood of pixels in a processed image. This approach is shown in FIG. 2, where an 8 bit input signal is supplied to a latch circuit 14, which latches the lower order 2 bits of the picture element data, that is the input color image signals. The latched data is multiplied by a set of weighting coefficients 1 to 1+n in a set of multipliers 15-0 to 15-n and delayed by a set of FIFO (FIRST IN FIRST OUT) circuits 16-0 to 16-n. The delayed outputs of the FIFO circuits are added to the input color signal associated with neighboring picture elements in an adder 17. The modified input signal is applied to a shift circuit 18 to provide a form of linear quantization. A shortcoming with this process is that the local mean of the input signal is not generally preserved in the quantized output signal. Since the local mean of the input signal is not preserved in the quantized output signal, the quantized output signal still displays contouring artifacts.

SUMMARY OF THE INVENTION

The object of the present invention is to provide a method for performing color calibration or a color space transformation which reduces the problems noted above.

The object is achieved according to the present invention by adding local mean preserving spatial modulation to the color input signals representing a color input image to produce modified color input signals; quantizing the modified color input signals to provide color signals having quantization levels corresponding to the values stored in a color-calibration look-up table; and retrieving output color signals stored in the color-calibration look-up table. "Adding local mean preserving spatial modulation" as used herein means any technique for adding position dependent modulation to an image signal such as dither or error diffusion in a manner such that the local mean of the input signal is preserved in the quantized output signal.

These and other objects of the present invention will become more apparent when taken in conjunction with the following description and drawings wherein like characters indicate like parts and which drawings form a part of the present description.

DESCRIPTION OF THE PREFERRED EMBODIMENTS

Figure 3:
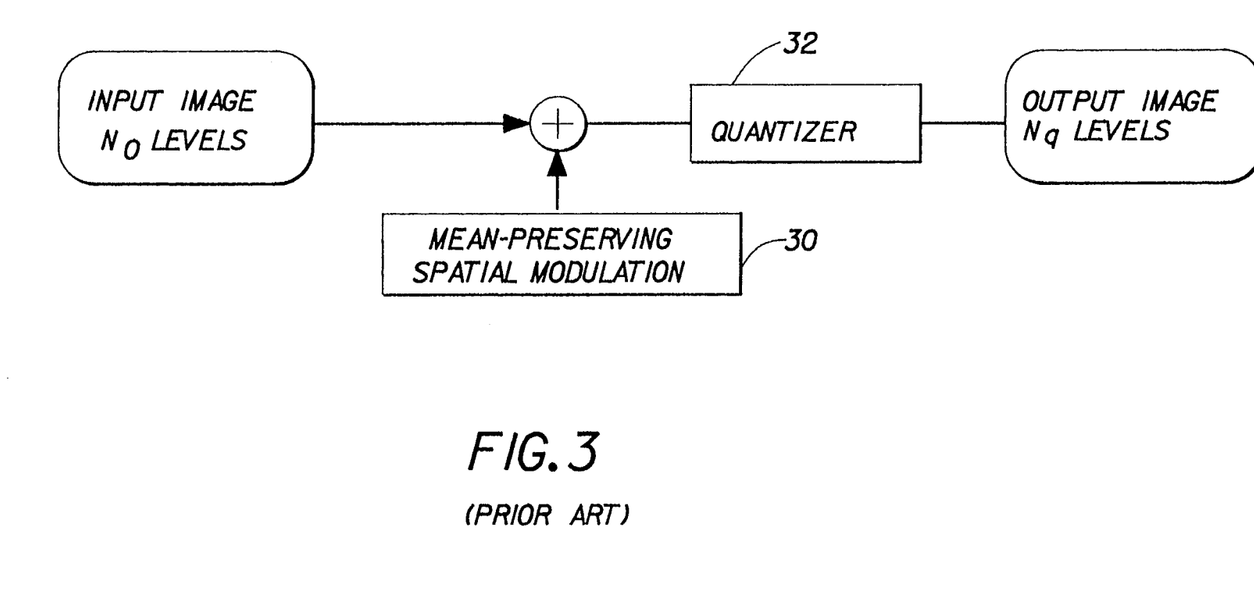
FIG. 3 is a block diagram of a generalized prior art halftoning algorithm useful in describing the present invention.

Halftoning is a method which is used in many image display devices to create the appearance of intermediate tone (or color) values when only a limited number of output display levels are available. For example, if a laser printer can produce only black or white regions on the image, it is possible to create the appearance of various gray levels by turning on varying numbers of image picture elements (pixels) in some local image region. This approach relies on the fact that the human eye will average over a small area of the image to give the impression of an intermediate gray level. When more than two output levels are used, it is generally referred to as multi-level halftoning (see Gentile et al "Quantization and multilevel halftoning of color images for near-original image quality", Vol. 7, No. 6/June 1990/J. Opt. Soc. Am. A, page 1021). One way to model halftoning is by the addition of a local mean preserving spatial modulation to the input signal prior to a quantization step as is shown in FIG. 3. Many methods to introduce this spatial modulation to the input signal have been described in the literature. One common approach is the addition of a periodic dither signal. The dither signal is typically stored in a dither matrix having values arranged in a specified pattern. The range of the values stored in the dither matrix in combination with the threshold levels in the quantizers are selected so that the quantized output signal has the same local mean as the input signal. Typical dither matrix patterns include random patterns, center-growing dot patterns, Bayer dither patterns, blue noise patterns, and minimum visual noise patterns (see Ulichney, *Digital Halftoning*, MIT Press, Cambridge Mass., 1990; U.S. Pat. No. 5,111,310; U.S. Pat. No. 4,920,501; U.S. patent application Ser. No. 08/131,801, filed Oct. 4, 1993, entitled "Method and Apparatus for Generating a Halftone Pattern for a Multi-Level Output Device", by K. Spaulding and L. Ray). Another method which is commonly used to add the spatial modulation is known as error-diffusion. Error-diffusion works by spreading the error made in quantizing one pixel to nearby unprocessed image pixels. This will insure that the local mean of the tone level will be preserved.

Our invention involves the combination of local mean preserving spatial modulation (multi-level halftoning) with a multi-dimensional color-calibration look-up table to reduce the visibility of the quantization artifacts associated with the look-up table. Since the human eye will average the colors over a small local area of the image, the result will be the creation of apparent output color values which are intermediate to the output color values stored in the look-up table. This has the advantage over conventional interpolation techniques that the device architecture is simpler, and implementation speeds are generally faster.

Figure 4:
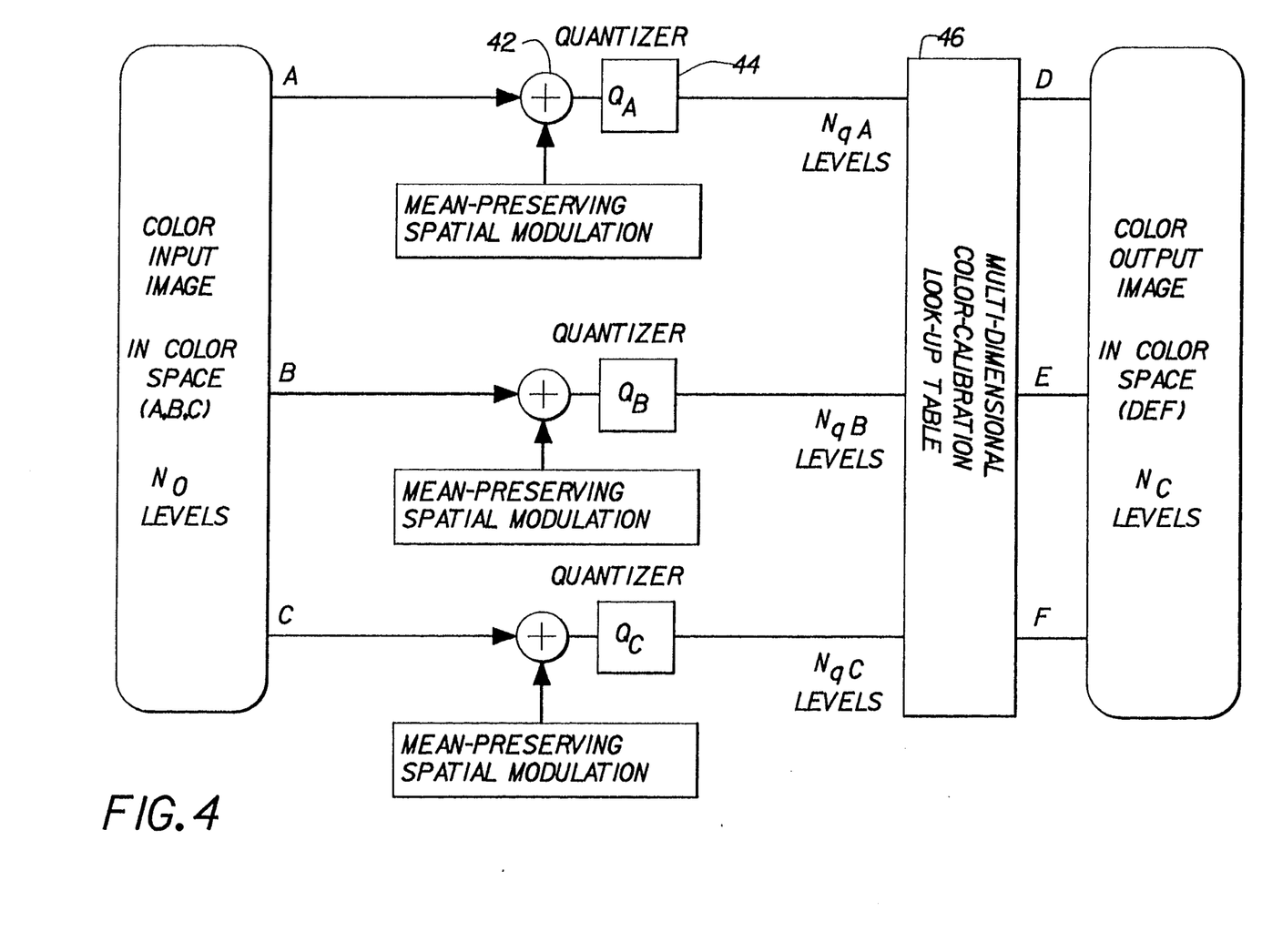
FIG. 4 is a block diagram of a portion of a system like that shown in FIG. 1, further including the addition of local mean preserving spatial modulation to the input color values to reduce contouring in the output image according to the present invention.

Referring to FIG. 4, in a generalized environment input color image data exists in some multi-channel color space, denoted as ABC, where ABC may represent RGB, XYZ, CIELAB, CIELUV, CMY(K), etc. The color coordinates in this space are known with some precision specified by the number of digital levels, $N_o$. It is desired to convert the color information for the image into another color space, denoted as DEF, with some precision specified by the number of digital levels, $N_c$, in the output color space. The color conversion is carried out by first applying spatial modulation 40 to the input color values using an adder 42, to form modified input color values $A_m$, $B_m$, and $C_m$. The amplitude of the spatial modulation should generally be related to the size of the quantization intervals associated with the quantizers 44. If quantizers 44 have non-uniform quantization intervals (such quantizers will be call non-linear) it will be desirable to have the amplitude of the spatial modulation be a function of the input color levels. The spatial modulation can either be image-independent, such as when applying a periodic dither signal, or image-dependent, such as when using an error diffusion algorithm. The quantizers 44 map the modified input color signals to $N_q$ quantization levels providing quantized color signals $A_q$, $B_q$, and $C_q$. The quantized color signals are then used to address a multi-dimensional color-calibration look-up table 46. In some cases, the number of digital levels for each channel of the input color space may be different, e.g., channel B may have $N_{qB}=64$ levels, and channels A and C may have $N_{qA,C}=32$ levels. The number of dimensions for the look-up table 46 corresponds to the number of color parameters in the input color space. Usually this is three dimensions, with the exception of CMYK space which would have four dimensions. The color-calibration look-up table 46 contains pre-calculated output color values for every possible combination of quantized input color values. This approach can be implemented in digital hardware and permits fast "computation" of the color transformation even when the actual mathematical equations relating the two color spaces are very complex.

Figure 5:
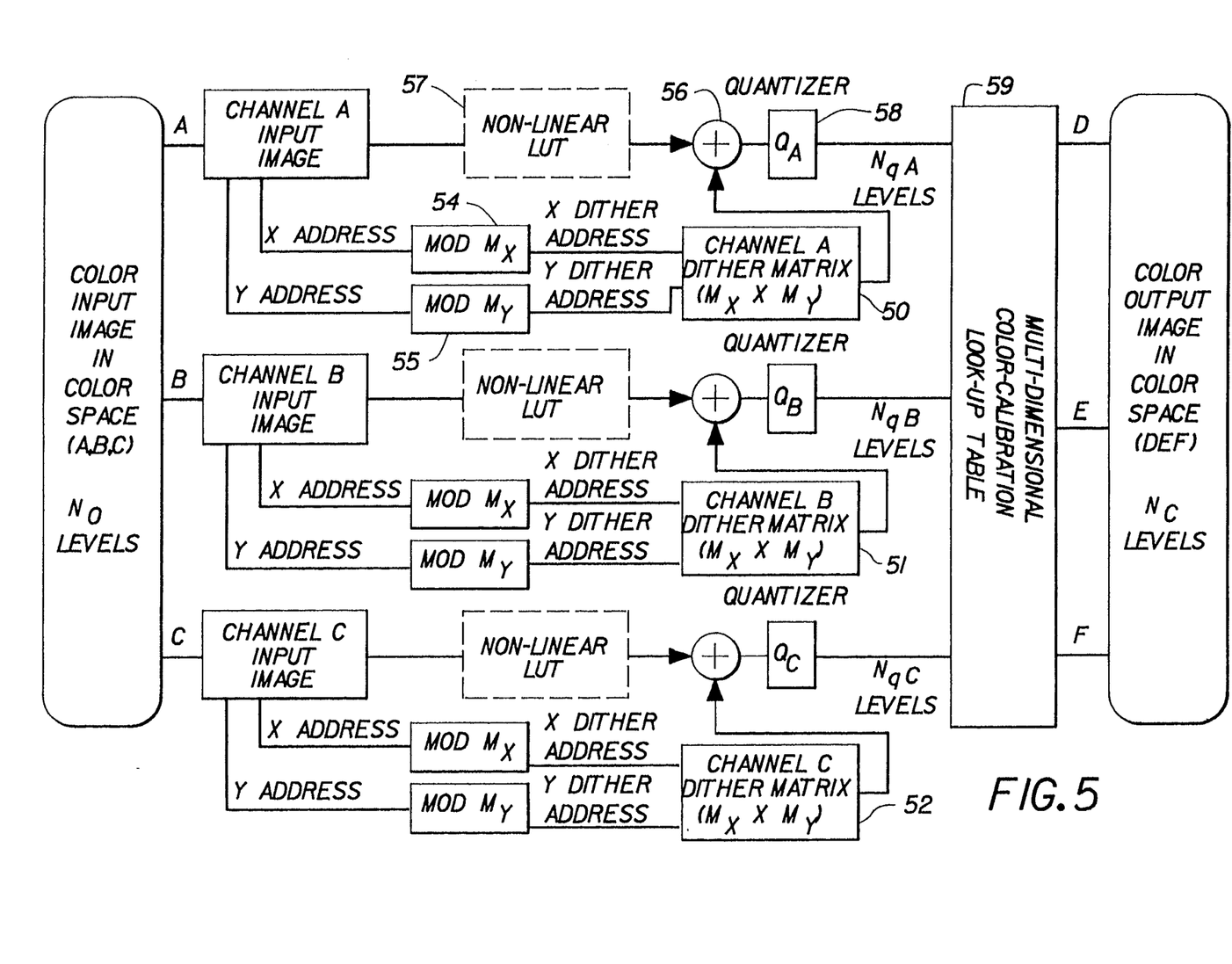
FIG. 5 is a block diagram of a portion of a system like that shown in FIG. 4, where the local mean preserving spatial modulation is introduced by adding a dither signal.

FIG. 5 shows a specific implementation of this invention which uses a local mean preserving dithering process to introduce the spatial modulation to the input color values. The dithering is carried out using a group of $m_x$ by $m_y$ dither matrices 50, 51, and 52 for color channels A, B, and C, respectively. The values stored in the dither matrices may be comprised in a variety of ways such as a Bayer pattern, a center-grown dot pattern, a random pattern, a blue noise pattern, or a minimum visual noise pattern as described above. The dither patterns stored in the dither matrices 50, 51, and 52 may all be the same, or they may be different. To preserve the local mean of the input signals, the output of the quantizer for each quantization interval should be equal to the mean of the input range of the quantization interval minus the mean of the values stored in the dither matrix. For this example we will assume that the output of the quantizer will be equal to the mean of the input range of the quantization interval. This implies that the dither matrix values should have a mean of zero. The range of dither values should equal the input range of the quantization interval, so that in this case each dither matrix contains values uniformly distributed between $\pm \Delta/2$, where $\Delta$ is the size of the quantization interval associated with the quantizers 58. The operation of the dithering process will be described for the A channel, the B and C channels being similar. The moduli (i.e. the lower order bits) of the x and y address of the current pixel location are taken (54, 55) to form addresses to the dither matrix. The dither matrix returns a dither value in the range $\pm \Delta/2$, which is combined with the input pixel value using an adder 56 to form a modified input pixel value which is applied to the quantizer 58. The output of the quantizers 58 in the A, B and C channels are used to address the multi-dimensional color-calibration look-up table 59, to produce the color output image in color space DEF.

Figure 6:
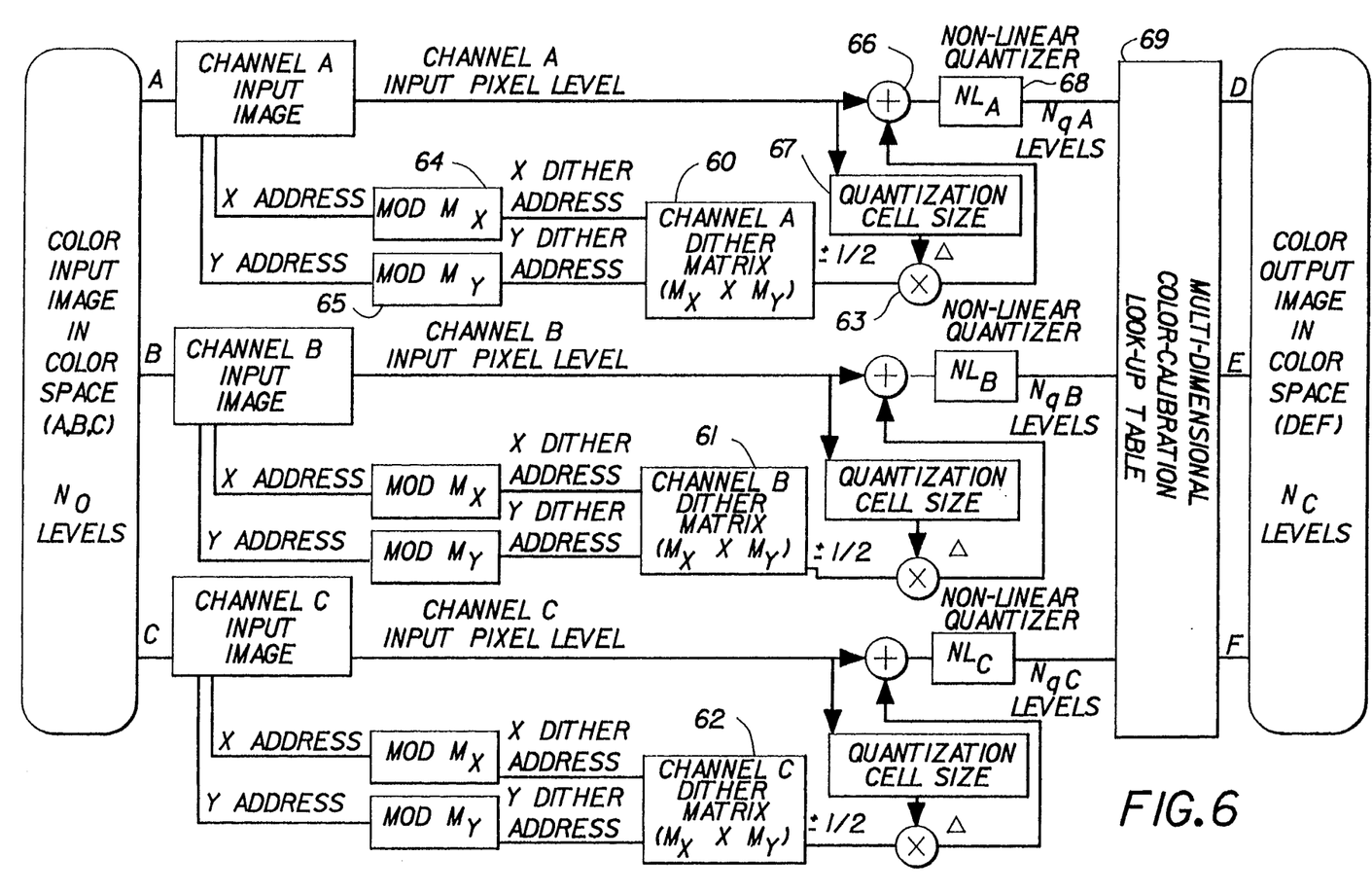
FIG. 6 is a block diagram of a portion of a system like that shown in FIG. 5, wherein the amplitude of the dither signal is scaled by a factor which is a function of the input pixel value.

FIG. 6 shows a specific implementation of this invention which uses a non-linear dithering process to introduce the spatial modulation to the input color values. For this example, non-linear quantizers 68 are used, and it is therefore desirable to adjust the amplitude of the dither in each channel proportionally to the size of the steps in the quantizers. The non-linear dithering is carried in much the same way as with the linear case shown in FIG. 5, with the exception that the dither values are scaled by a factor which is a function of the input pixel level. One convenient implementation of this scale factor is to form a look-up table 67 which stores the quantization cell size $\Delta$ for each input pixel level. This arrangement is repeated for each color channel. As in FIG. 5, the moduli (i.e. the lower order bits) of the x and y address of the current pixel location are taken (64, 65) to form addresses to the dither matrix. The dither matrix values are scaled so that the outputs of the dither matrix are in the range $\pm \frac{1}{2}$. The input pixel value is used to address the quantization cell size look-up table 67 that returns the value $\Delta$ representing the size of the quantization step for the current input pixel value. The value $\Delta$ is multiplied by the dither value from the dither matrix at the multiplier 63 to produce the non-linear dither value. The non-linear dither value is added to the input pixel value at adder 66, and the sum is applied to the non-linear quantizer 68. The output of the non-linear quantizers 68 in the A, B, and C channels are used to address the multi-dimensional color-calibration look-up table 69, to produce the color output image in color space DEF.

Non-linear dither could also be implemented using the linear dither method shown in FIG. 5 with the addition of non-linear look up tables 57 (shown in Phantom) applied to each channel of the input image signal. The non-linear look up tables in combination with linear quantizers give the desired non-linear quantization. This arrangement has the advantage of not requiring the multiply step shown in FIG. 6.

Figure 7:
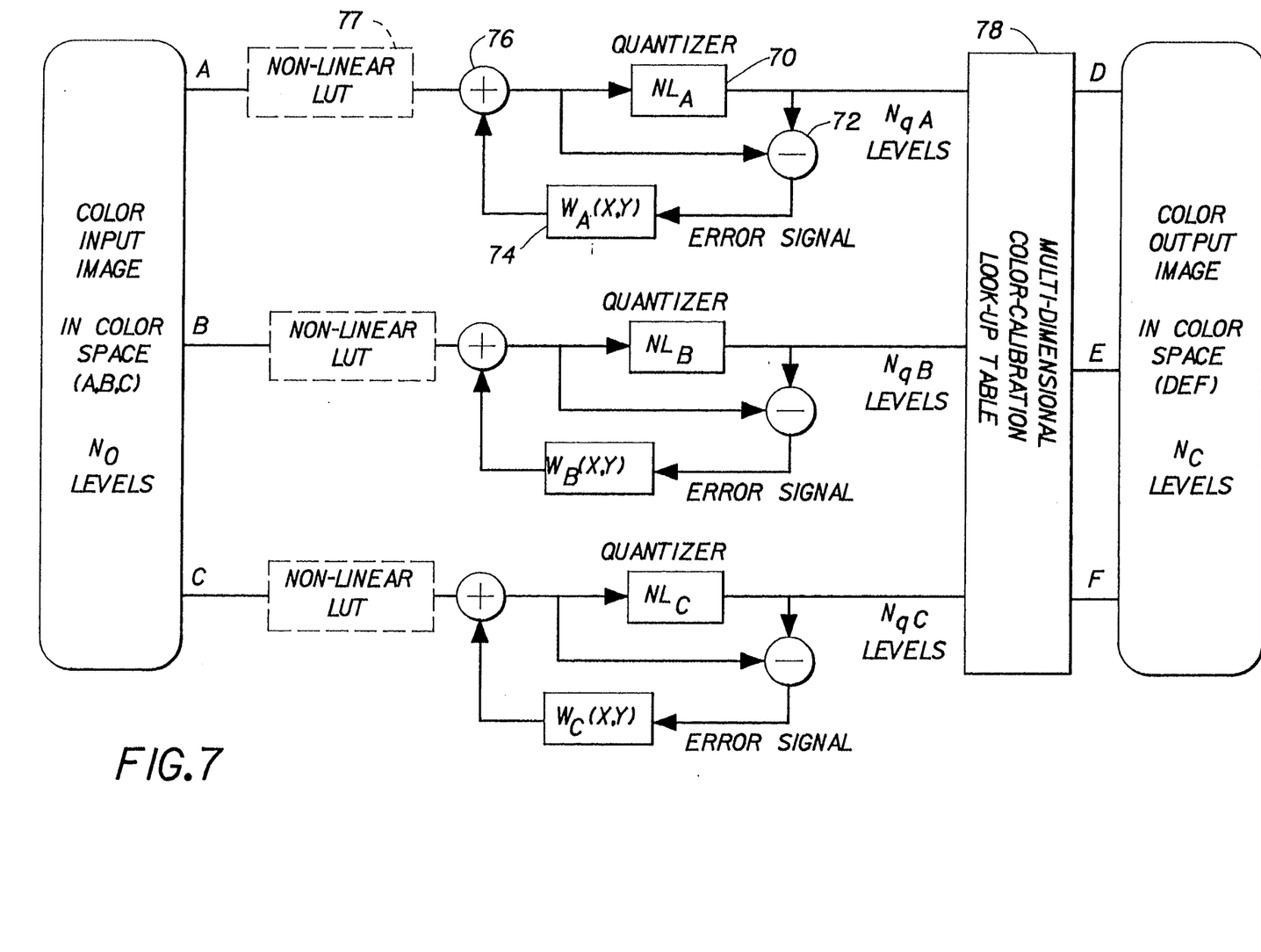
FIG. 7 is a block diagram of a portion of a system like that shown in FIG. 4, where the mean preserving spatial modulation is introduced by using a mean preserving error diffusion algorithm.

Another method for introducing the spatial modulation to the input color signals is to use a local mean preserving error diffusion algorithm. A block diagram showing an implementation of this approach is shown in FIG. 7. For each input channel, an input pixel value is quantized by the quantizer 70 to form a quantized pixel value. A difference signal is calculated 72 between the quantized pixel value and the input pixel value to represent the error introduced by the quantization process. The difference signal is weighted by a series of error weights 74, and is added 76 to the input pixel values of nearby image pixels which have yet to be processed. As before, the quantized pixel values are used to address the multi-dimensional color-calibration look-up table 78, to produce the color output image in color space DEF. The error feedback associated with this approach insures that the local mean input signal level will be preserved in the quantized signal. This implementation differs from the prior art approach shown in FIG. 2 above in that the error signal is calculated from the quantized signal rather than the input signal. Generally, although there are more computations involved than in the dither approaches described above, the appearance of the spatial modulation introduced by error diffusion will be preferable to that obtained with a dither approach. Alternatively, if non-linear quantization is used, non-linear look up tables 77 may be used (as shown in phantom in FIG. 7) to modify each channel of the input image signal so that simple linear quantizers may be used for the quantizers 70.

While there has been shown what is considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

PARTS LIST 10 quantizers
12 color-calibration look-up table
14 latch circuit
15 multipliers
16 FIFO circuits
17 adder
18 shift circuit
30 spatial modulation source
32 quantizer
40 spatial modulation source
42 adder
44 quantizer
46 color-calibration look-up table
50 dither matrices
51 dither matrices
52 dither matrices
54 modulo operator
55 modulo operator
56 adder
57 non-linear look-up table
58 quantizer
59 color-calibration look-up table
60 dither matrices
61 dither matrices
62 dither matrices
63 multiplier
64 modulo operator
65 modulo operator
66 adder
67 look-up table
68 quantizer
69 color-calibration look-up table
70 quantizer
72 differencer
74 error weights
76 adder
77 non-linear look-up table
78 color-calibration look-up table

We claim:

1. Apparatus for transforming a digital input color image signal expressed in a first color space, into a digital output color image signal expressed in a second color space, comprising:

means for receiving the input color image signal and applying spatial modulation to each channel of the input color image signal to produce a modified color image signal;
a quantizer for each channel of the image signal having as input the modified color image signal, and producing as output a quantized color image signal;
color-calibration look-up table means connected to the output of said quantizers for receiving quantized color image signals expressed in said first color space, and producing output color image signals expressed in said second color space; and
said spatial modulation being of a type that preserves the local mean of the quantized color image signal.

2. The apparatus in claim 1 wherein said spatial modulation is provided by adding a periodic dither pattern to each channel of the input color image signal.

3. The apparatus in claim 2 wherein the amplitude of said periodic dither pattern is a function of the input color image signal level.

4. The apparatus in claim 1 wherein said spatial modulation is provided by computing a difference signal between the input color image signal and the quantized color image signal, applying a series of weights to the difference signal to form a set of weighted difference signals, and adding the weighted difference signals to nearby unprocessed input image pixels.

5. The apparatus claimed in claim 1, further comprising: non-linear look-up table means for modifying the input color image signal prior to applying the spatial modulation to each channel of the color image signal.

6. A method for transforming a digital input color image color image signal in a first color space, into a digital output color image signal expressed in a second color space, comprising the steps of:

a.) applying spatial modulation to each channel of the input color image signal to produce a modified color image signal, said spatial modulation being of the type that preserves the local mean of the quantized color image signal;
b.) quantizing the modified color image signals to produce quantized color image signals; and
c.) retrieving output color image signals from a color-calibration look-up table as a function of the quantized color image signals.

7. The method in claim 6 wherein said spatial modulation is provided by adding a periodic dither pattern to each channel of the input color image signal.

8. The method in claim 7 wherein the amplitude of said periodic dither pattern is a function of the input color image signal level.

9. The method in claim 6 wherein said spatial modulation is provided by computing a difference signal between the input color image signal and the quantized color image signal, applying a series of weights to the difference signal to form a set of weighted difference signals, and adding the weighted difference signals to nearby unprocessed input image pixels.

10. The method claimed in claim 6, further comprising the step of modifying the input color image signal with a non-linear look-up table prior to the step of applying spatial modulation to the input color image signal.

* * * * *